United States Patent
Martucci et al.

(10) Patent No.: US 6,289,274 B1
(45) Date of Patent: Sep. 11, 2001

(54) FUZZY LOGIC BASED FUEL FLOW SELECTION SYSTEM

(75) Inventors: Angelo Martucci, South Windsor; Allan J. Volponi, West Simsbury, both of CT (US)

(73) Assignee: United Technologies Corporation, Windsor Locks, CT (US)

( * ) Notice: Subject to any disclaimer, the term of this patent is extended or adjusted under 35 U.S.C. 154(b) by 0 days.

(21) Appl. No.: 09/374,439

(22) Filed: Aug. 13, 1999

(51) Int. Cl.[7] .................... G06F 19/00; G05B 13/02; F02C 9/26
(52) U.S. Cl. ............................ 701/100; 60/39.03
(58) Field of Search ................... 701/100, 106; 60/39.03; 706/905; 416/30

(56) References Cited

U.S. PATENT DOCUMENTS

| | | |
|---|---|---|
| 4,756,667 | 7/1988 | Wyrostek et al. . |
| 4,984,425 | 1/1991 | Smith . |
| 5,022,224 | 6/1991 | Smith . |
| 5,023,793 | 6/1991 | Schneider et al. . |
| 5,029,091 | 7/1991 | Schneider et al. . |
| 5,174,718 | 12/1992 | Lampeter et al. . |
| 5,249,417 | 10/1993 | Duesler et al. . |
| 5,303,545 | 4/1994 | Larkin . |
| 5,357,421 | 10/1994 | Tautz et al. .................... 364/133 |
| 5,379,583 | 1/1995 | Zickwolf, Jr. . |
| 5,391,055 | 2/1995 | Carvalho . |
| 5,408,412 | 4/1995 | Hogg et al. . |
| 5,416,699 | 5/1995 | DiValentin et al. . |
| 5,433,079 | 7/1995 | Badami et al. .................... 60/660 |
| 5,447,023 | * 9/1995 | Meisner et al. ................ 60/39.02 |
| 5,452,200 | 9/1995 | Barry .............................. 364/161 |
| 5,481,648 | * 1/1996 | Volponi et al. .................... 706/45 |
| 5,524,599 | * 6/1996 | Kong .............................. 123/682 |
| 5,553,449 | 9/1996 | Rodgers et al. . |
| 5,687,564 | 11/1997 | Kelly et al. . |
| 5,718,111 | * 2/1998 | Ling et al. .................... 60/39.02 |
| 5,735,122 | 4/1998 | Gibbons . |
| 5,752,379 | 5/1998 | Schafer et al. . |
| 5,784,884 | 7/1998 | Poerio et al. . |
| 5,806,052 | * 9/1998 | Bonissone et al. .................. 706/4 |
| 5,865,599 | 2/1999 | Pruden et al. . |
| 5,915,917 | 6/1999 | Eveker et al. . |
| 6,119,446 | * 9/2000 | Shon .............................. 60/39.03 |

\* cited by examiner

Primary Examiner—Michael J. Zanelli (57) ABSTRACT

A fuzzy logic based fuel flow selection (control) system is presented. Control loops are used to provide desired engine fuel flow control. These loops receive engine operating parameters and provide fuel flow command values in accordance with corresponding transfer functions. These command values are presented to selection logic, which provides a command value based on outputs of the control loops. The command value integrated by a common integrator to provide and integrated command value which is the fuel flow command that is presented to a fuel metering unit at the engine. Each loop has a level of authority assigned to it, which is computed in terms of fuzzy rules and membership functions. Thus at any given moment, more than one loop may be in control to differing levels of authority, whereby the present invention provides a smoother transition between loops competing for control with an attendant increase in system performance.

10 Claims, 6 Drawing Sheets

FIG.3

| RULE # | LOOP ERRORS | | | WFDOT ERRORS | | OUTPUTS | | | COMMENTS |
|---|---|---|---|---|---|---|---|---|---|
| | N1 GOV | ACCEL | DECEL | WfdN1−WfdAcc | WfdN1−WfdDec | N1 GOV | ACCEL | DECEL | |
| 1 | SN | | | LN or SN or ZE | SP or LP or ZE | ON | OFF | OFF | N1Wfd(<=Accel)&(<>=Decel) |
| 2 | ZE | | | LN or SN or ZE | SP or LP or ZE | ON | OFF | OFF | N1Wfd(<=Accel)&(<>=Decel) |
| 3 | SP | | | LN or SN or ZE | SP or LP or ZE | ON | OFF | OFF | N1Wfd(<=Accel)&(<>=Decel) |
| 4 | SN | | | LP or SP | | OFF | ON | OFF | N1 Wfd(>Accel) |
| 5 | ZE | | | LP or SP | | OFF | ON | OFF | N1 Wfd(>Accel) |
| 6 | SP | | | LP or SP | | OFF | ON | OFF | N1 Wfd(>Accel) |
| 7 | LP | SN | | | | OFF | ON | OFF | |
| 8 | LP | ZE | | | | OFF | ON | OFF | |
| 9 | LP | SP | | | | OFF | ON | OFF | |
| 10 | LP | LP | | | | OFF | ON | OFF | |
| 11 | LP | LN | | | | OFF | OFF | ON | |
| 12 | SN | | | | LN or SN | OFF | OFF | ON | N1 Wfd(<Decel) |
| 13 | ZE | | | | LN or SN | OFF | OFF | ON | N1 Wfd(<Decel) |
| 14 | SP | | | | LN or SN | OFF | OFF | ON | N1 Wfd(<Decel) |
| 15 | LN | | LN | | | OFF | ON | ON | |
| 16 | LN | | SN | | | OFF | OFF | ON | |
| 17 | LN | | ZE | | | OFF | OFF | ON | |
| 18 | LN | | SP | | | OFF | OFF | ON | |
| 19 | LN | | LP | | | OFF | ON | OFF | |

FUZZY LOGIC BASED FUEL FLOW SELECTION SYSTEM

FIELD OF THE INVENTION

This invention relates to feedback control techniques, for example, those used in gas turbine engine fuel controls using a plurality of engine operating parameters to regulate fuel control as function of commanded engine power.

BACKGROUND OF THE INVENTION

The conventional gas turbine fuel control is complex electro-mechanical device that uses a number of engine operating conditions (parameters) to regulate fuel flow to the burner to achieve and maintain a commanded engine speed, such as rotor speed N1. The fuel control, using feedback, responds to power lever setting (PLA) to match commanded power and rotor (fan) speed. Among the engine operating parameters that the control typically uses are N1 and N2, respectively the speed of the low and high speed rotors. Other parameters include the temperature and pressure at the inlet and within the compressor stage and exhaust nozzle orientation, in the case of high performance engines employing variable pitch and area exhaust nozzles.

Depending on engine and flight conditions, such a command for peak acceleration from cruise, the control may select one parameter over another on which to "close the loop" for fuel flow to the engine. The transfer function for the control path for each parameter is a so-called proportional integral control, which provides good response and accuracy for aircraft engine applications. The basic transfer for fuel flow WF may be expressed as:

$$WF_t = K1 \cdot \int WF_{Return} + K2 \cdot \Delta \delta t$$

where $WF_t$ is the total fuel flow at time t. Ideally, the output from each loop (for each engine operating parameter) produces the same scheduled fuel flow ($WF_{Return}$) at all times, and if that were true, selecting one loop over another would be invisible in the sense that there would be no immediate change in $WF_{Return}$ at selection. This is not the case, however, because the parameters have different relationships to engine operation at any instant and thus one may command more or less $WF_{Return}$ than another at any instant in time, creating a significant stability problem when selecting one channel (loop) over another.

Presently, selection is made between multiple control loops (e.g., N1, N2 and acceleration/deceleration loops) to control a common output. Each loop's response characteristic is defined independently of the other loops by using the current output from the control, i.e., the output for each loop is calculated based on the current control output. The output of all loops are then compared to determine which loop should be selected to produce the control output. Selection is typically based on a series of minimum and maximum selection gates on the output of each control loop. Accordingly, each loop is designed and optimized as a standalone. However, when these loops are configured to work together as a system, using such a selection method, less than optimal control is provided.

One such less than optimal control scenario is found in the interrelationship between the rotor speed (N1, N2) loops and the acceleration/deceleration loops. The rotor speed loops seek to hold a particular engine rotor speed at a particular operating point, such control loops are traditionally designed to be very conservative. The acceleration/deceleration loops seek to take the engine from one power setting to another as fast as possible without exceeding any physical engine operating parameters, whereby such control loops are designed to be very aggressive. It has been found that when a traditional minimum gate is used to select between these control loops, the system will switch off of the acceleration/deceleration loops at a less than optimal time. This results in a transition from one power setting to another that is not as fast as it could have been, had the system continued with the acceleration/deceleration loops for a slightly longer period of time.

SUMMARY OF THE INVENTION

The above-discussed and other drawbacks and deficiencies of the prior art are overcome or alleviated by the fuzzy logic based fuel flow selection (control) system of the present invention. Rotor Speed Governing Loops, Acceleration/Deceleration Loops and Limiting Loops are control loops that provided the desired engine fuel flow control. These loops receive engine operating parameters and provide fuel flow command values in accordance with corresponding transfer functions, as is known. These command values are presented to selection logic, which provides a command value based on outputs of the control loops. The command value integrated by a common integrator to provide an integrated command value which is the fuel flow command that is presented to a fuel metering unit at the engine. Each loop has a level of authority assigned to it, which is computed in terms of fuzzy rules and membership functions. Thus at any given moment, more than one loop may be in control to differing levels of authority, whereby the present invention provides a smoother transition between loops competing for control with an attendant increase in system performance.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1:
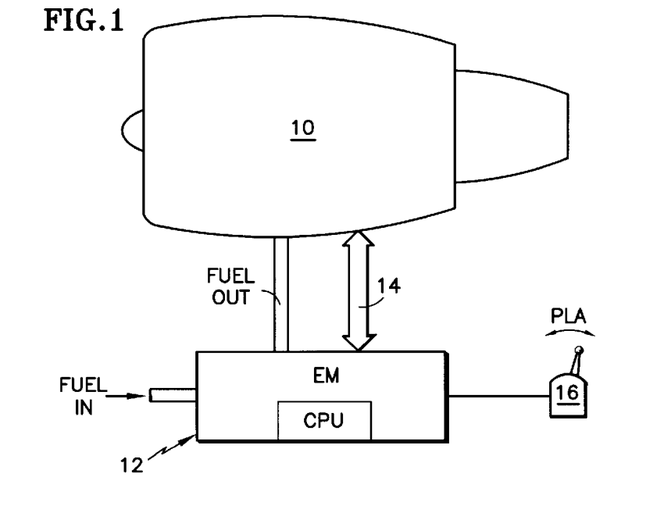
FIG. 1 is a simplified block diagram showing an aircraft jet engine control system with a computer based control for employing the present invention.

Referring to FIG. 1, a high bypass aircraft gas turbine engien 10 is connected to a fuel control 12 that includes a FADEC (full authority digital engine control) employing a processor (signal processor, microprocessor or central processing unit (CPU)) 14. All components of the processor, such as clocks, registers and input/output (I/O) ports have not been shown as these components and their uses are well known. The fuel control 12 basically controls electromechanical elements that regulate fuel flow to the engine 10. The fuel control 12 is connected electrically to the engine 10 over a plurality of data lines (a bus) 14 over which it receives data on various engine operating parameters, such as N1 and N2. The fuel control 12 responds to these signals and the position of the power lever setting (PLA) of a power lever 16. The pilot, for example, advances lever 16 to command more engine power, such as a particular N1, which correlates to engine trust. The fuel control senses actual N1 and compares it with N1 computed for PLA and produces a fuel flow to achieve that value of N1. In the prior art, the fuel flow was controlled so that the resultant fuel flow from the N1 loop did not violate the N2 acceleration limits by switching based on the aforementioned minium/maximum gates to controlling fuel flow on N2 the acceleration rate. However, such has been found to provide less than optimal control.

Figure 2:
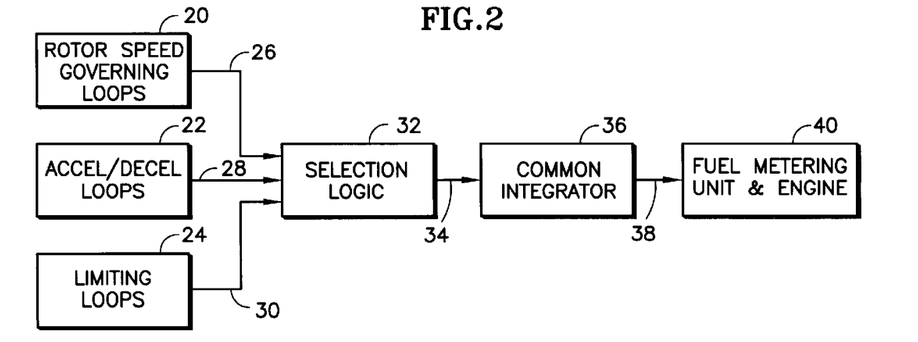
FIG. 2 is a simplified block diagram of a fuel flow selection system for employing the present invention.

Referring to FIG. 2, a block diagram of control logic for a FADEC is generally shown. Rotor Speed Governing Loops 20, Acceleration/Deceleration Loops 22 and Limiting Loops 24 are the control loops that are defined to provide the desired engine fuel flow control. These loops 20, 22 and 24 receive engine operating parameters and provide fuel flow command values in accordance with corresponding transfer functions, as is known. These command values are presented on lines 26, 28 and 30, from loops 20, 22 and 24 respectively, to selection logic 32. Section logic 32 provides the command value based on outputs of loops 20, 22 and 24, as described below. The command value is presented at a line 34 to a common integrator 36. Integrator 36 provides and integrated command value at line 38 which is the fuel flow command that is presented to a fuel metering unit 40 at the engine.

In the present invention each loop has a level of authority assigned to it, which is computed in terms of fuzzy rules and membership functions. The sum of these levels of authority is unity. Thus at any given moment, more than one loop may be in control to differing levels of authority, whereby the present invention provides a smoother transition between loops competing for control with an attendant increase in system performance.

Figure 4:
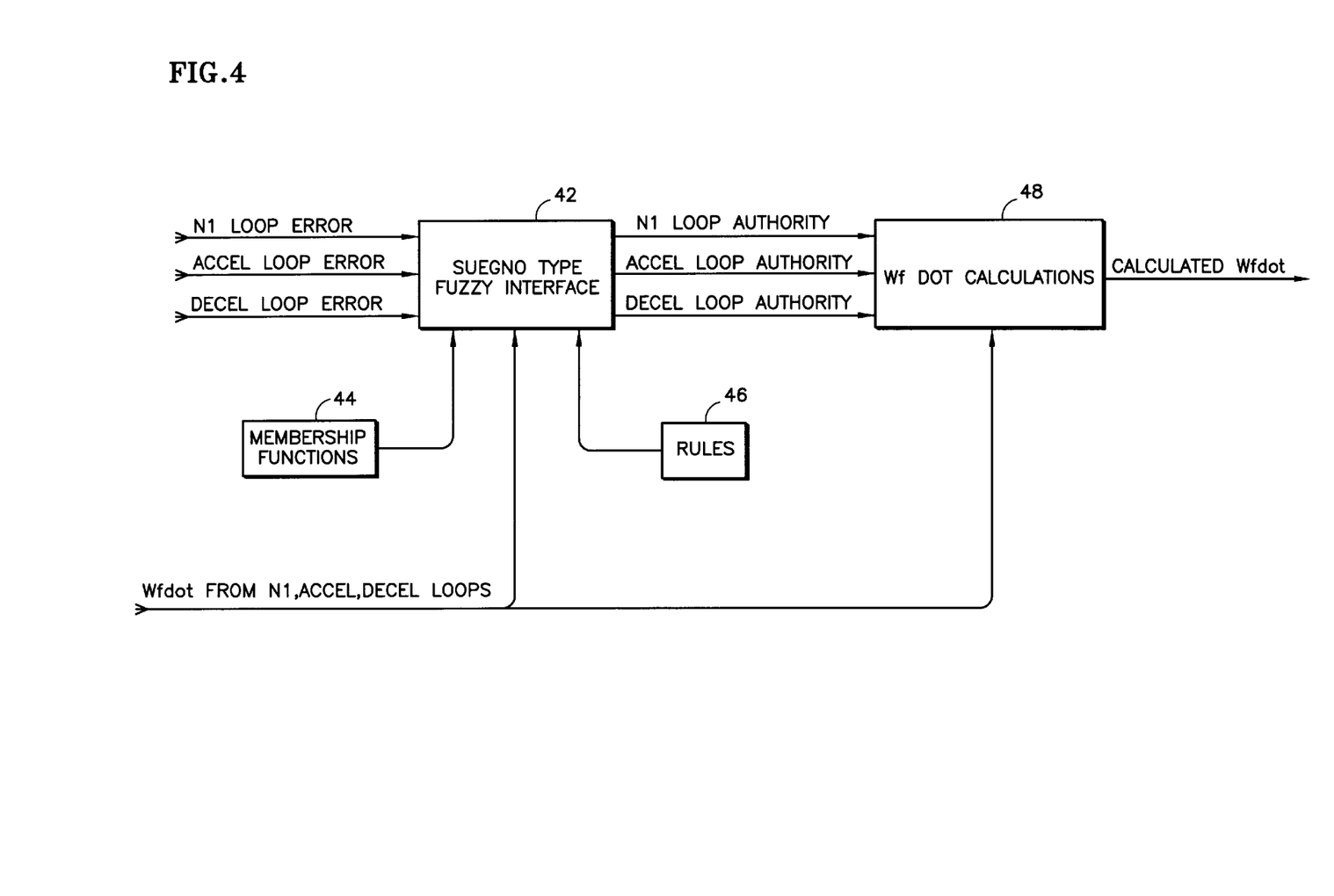
FIG. 4 is a simplified block of a fuzzy fuel flow selector portion of the fuel flow selection system in accordance with the present invention.
Figure 5A:
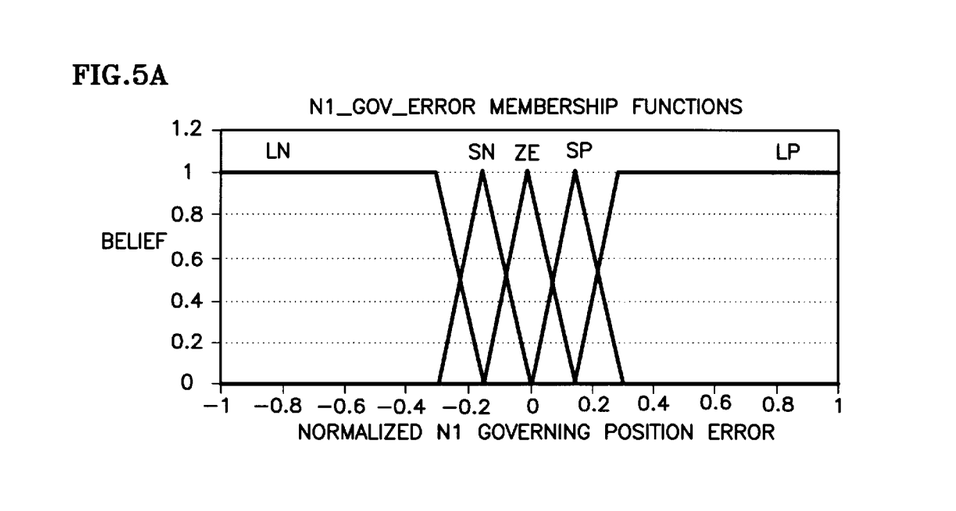
FIGS. 5A–E are diagrammatic plots of membership functions for the fuzzy fuel selector for FIG. 3.
Figure 5B:
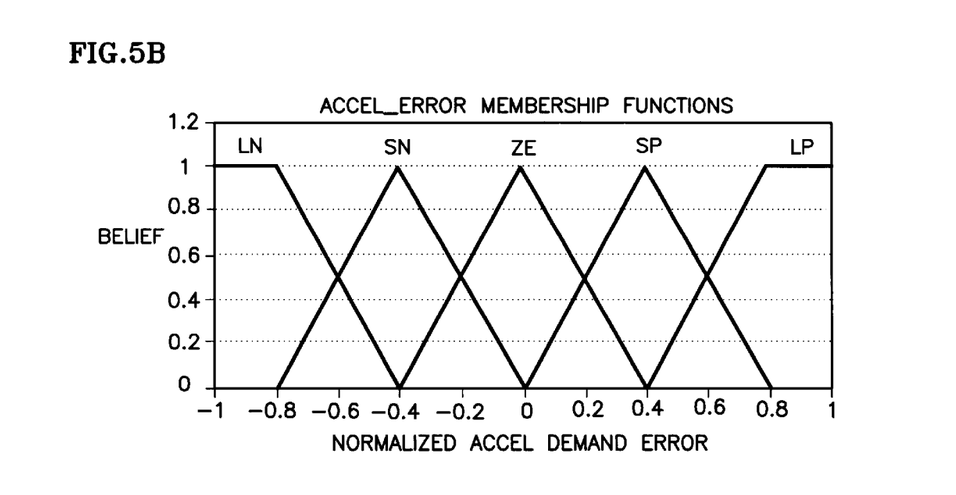
Figure 5C:
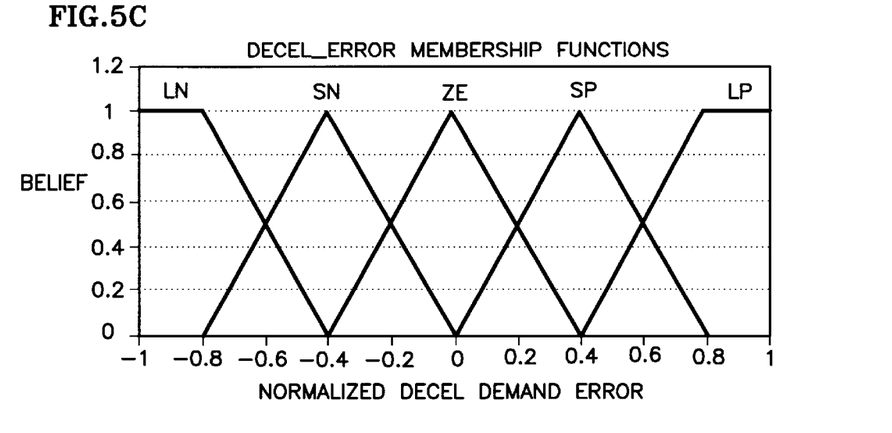
Figure 5D:
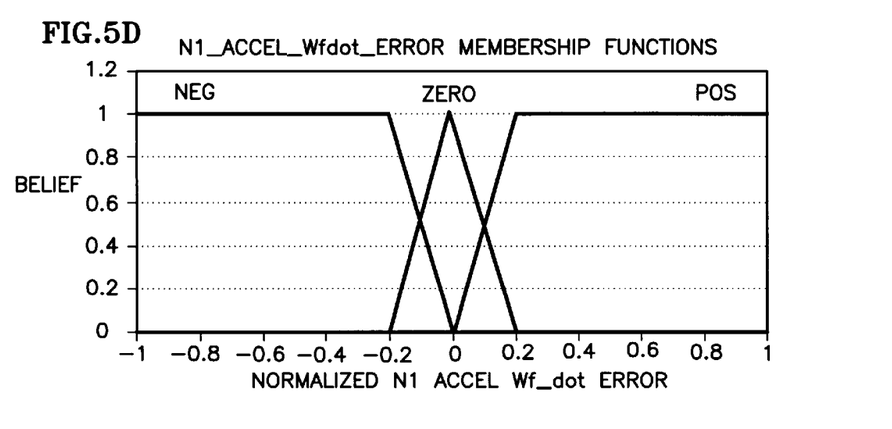
Figure 5E:
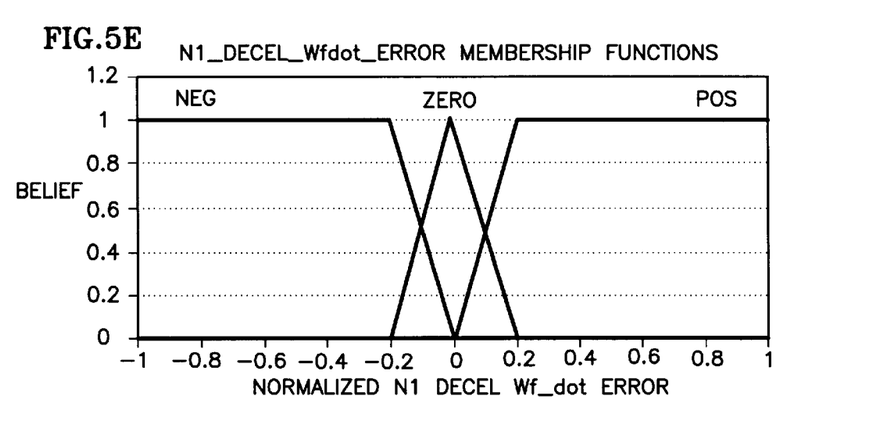

Referring to FIG. 4, a block diagram of the section logic 32 for Rotor Speed Governing Loop (N1, low speed rotor), acceleration loop and deceleration loop in a FADEC employing fuzzy logic of the present invention is generally shown. While this exemplary embodiment is directed to the Rotor Speed Governing Loop (N1), acceleration loop and deceleration loop, such is also intended to be directed to Rotor Speed Governing Loop (N2, high speed rotor) and other such control loops (e.g., NDA).

Signals indicative of N1 Loop Error, Acceleration Loop Error and Deceleration Loop Error are provided to a fuzzy interface 42. The N1 loop Error, Acceleration Loop Error and Deceleration Loop Error signals are error signals manifesting the difference between actual N1, acceleration and deceleration and a command value for those conditions. These error signals are divided by the maximum error for its corresponding loop to normalizes the error signals, whereby a non-dimensional loop error in the range of [−1,1] is provided for each of these error signals. Membership functions 44 and rules 46 are also applied to the fuzzy interface 42. The degree or level of authority for each of the control loops is determined from the corresponding error signal in accordance with the appropriate membership functions 44 and rules 46 by the fuzzy interface 42. The value of any level of authority is between 0 and 1. Accordingly, the fuzzy interface 42 provides signals indicative of N1 Loop Authority, Acceleration Loop Authority and Deceleration Loop Authority which are presented to a fuel command (Wf) calculation operation 48. Signals indicative of the fuel command values from the Rotor Speed Governing Loop (N1), acceleration loop and deceleration loop are also presented to the fuel command (Wf) calculation operation 48. The rate of change of fuel (Wf) is calculated from these control loop outputs and their associated degree of authority.

Figure 3:
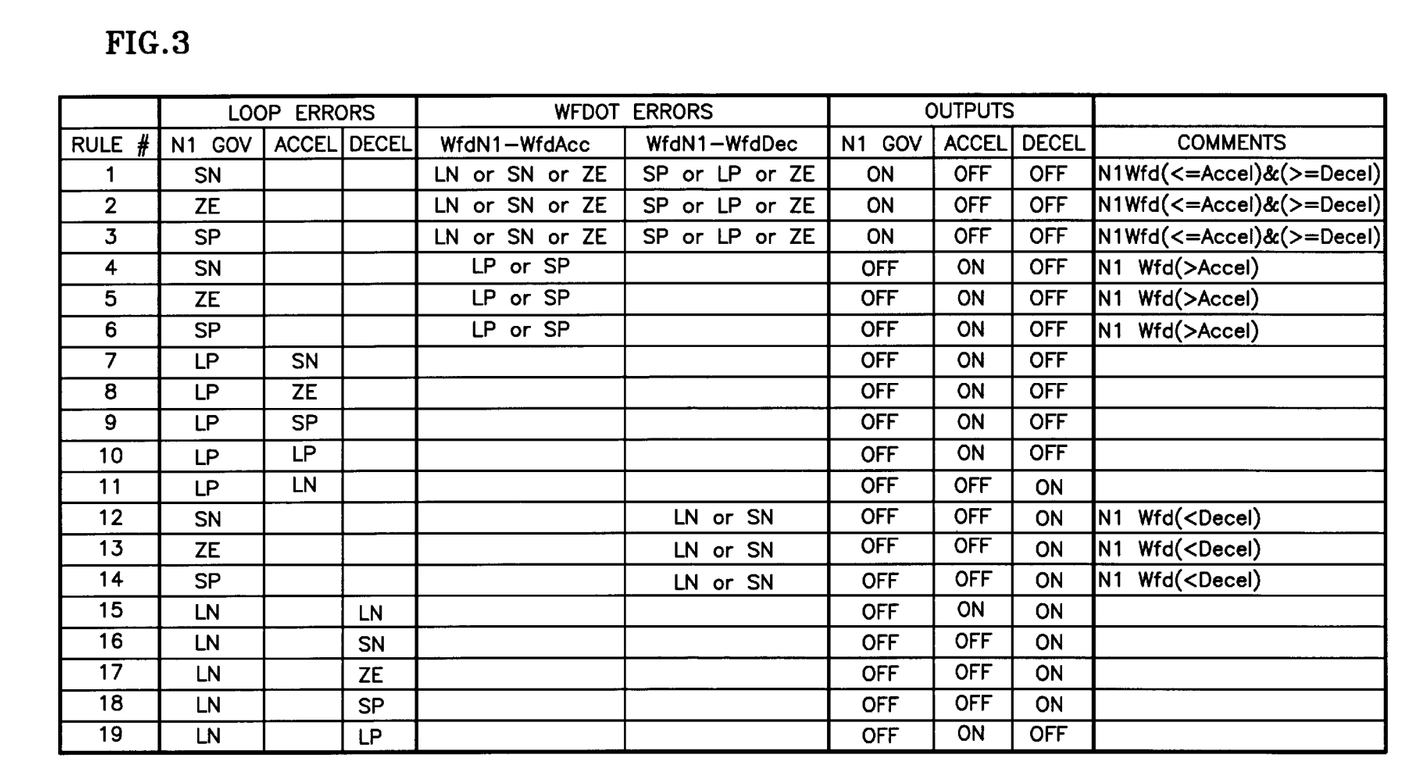
FIG. 3 is a lookup TABLE which is a representation of the rules applying the membership functions of the fuzzy system of the present invention.

A lookup TABLE, FIG. 3, is a representation of the rules 46 applying the membership functions 44. The input qualifiers LN (large negative), SN (small negative), ZE (zero), SP (small positive) and LP (large positive) are defined by the membership functions (loop errors) shown in FIGS. 5A–E. By way of example, rule 7 states:
IF N1_GOV_ERROR is Large Positive (LP) and ACCEL_ERROR is Small Negative (SN) THEN N1_GOV_LOOP is OFF, and ACCEL_LOOP is ON, and DECEL_LOOP is OFF The rules represented by the lookup TABLE can be presented with the output qualifiers ON and OFF being assigned to value 1 and 0 respectively. The TABLE can then in effect be expressed by an algorithm. Accordingly, the level of authority (i.e., a weight) for each control loop can as expressed as:

$$LA_k = \frac{\sum_{i=1}^{13} w_i X_{ik}}{\sum_{i=1}^{13} w_i} \quad k = 1, 2, 3$$

where
k corresponds to a column in the TABLE which correlates with each of the control loops,
$LA_k$ is said level of authority for the kth control loop,
i corresponds to a row in the TABLE,
$X_{ik}$ corresponds to an output qualifier at the ith row and kth column in said TABLE, and
$w_i$ corresponds to a input qualifier for the ith row.

The rate of change of fuel flow request (with the individual loop request leveraged by that loop's level of authority) can then be expressed by a combination as expressed in the following algorithm:

$$Wf_{REQ} = \sum_{k=1}^{3} (LA_k)(Wf_k)$$

where $Wf_{REQ}$ corresponds to said fuel flow request signal and $Wf_k$ corresponds to said fuel flow control signal for the kth control loop. A signal indicative of $Wf_{REQ}$ is computed over all performance loops and presented to integrator 36 to provide the final fuel flow request to fuel metering unit 40.

The processor 14 is preferably programmed to process the loop signals in accordance with the membership functions, rules, algorithms and lookup table of the present invention to provide a signal indicative of the final Wf request. The processor 14 is also programed to process the loop signals to provided the loop error signals described above. Memory of the processor (or discrete memory) is utilized to store executable signals for the membership functions, rules, algorithms and lookup table of the present invention.

Figure 6A:
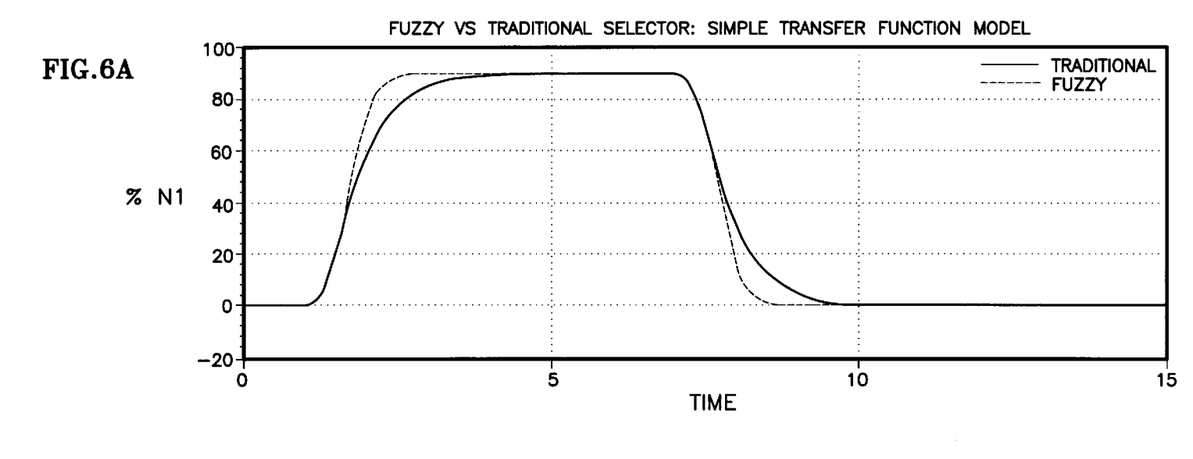
FIGS. 6A and B are plots of simple transfer functions for % N1 and loop control illustrating advantages of the present invention.
Figure 6B:
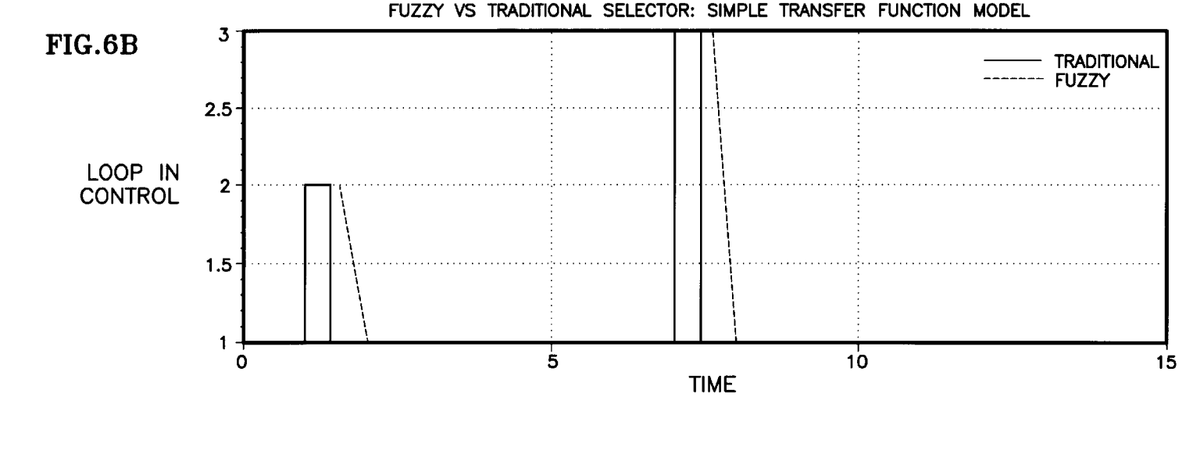

Referring to FIGS. 6A and B, simple transfer functions for % N1 and loop control are shown to illustrate the advantages of the control method of the present invention. The fuzzy logic approach of the present invention provides a more efficient transfer function than the traditional (prior art) method, in that the transition from one power setting to another is clearly faster using the method of the present invention.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of generating a fuel flow request signal for an engine, comprising:

generating a plurality of fuel flow control signals from a plurality of control loops;

assigning a level of authority to each of said fuel flow control signals based on fuzzy logic;

combining each of said fuel control signals based on said levels of authority to provide a fuel flow request signal;

wherein said fuzzy logic comprises a plurality of rules and membership functions;

wherein said rules comprise a lookup table having input and output qualifiers, said input qualifiers being defined by said membership functions; and wherein said membership functions include normalized loop errors.

2. A method of generating a fuel flow request signal for an engine, comprising:

generating a plurality of fuel flow control signals from a plurality of control loops;

assigning a level of authority to each of said fuel flow control signals based on fuzzy logic;

combining each of said fuel control signals based on said levels of authority to provide a fuel flow request signal;

computing said levels of authority based on a lookup table and a first algorithm, said lookup table having input and output qualifiers, said first algorithm being expressible as;

$$LA_k = \frac{\sum_{i=1}^{13} w_i X_{ik}}{\sum_{i=1}^{13} w_i} \quad k = 1, 2, 3$$

where k corresponds to a column in said lookup table which correlates with each of said control loops, $LA_k$ is said level of authority for the kth control loop, i corresponds to a row in said lookup table, $X_{ik}$ corresponds to a corresponding said output qualifier at the ith row and the kth column in said lookup table, and $w_i$ corresponds to a corresponding said input qualifier for the ith row.

3. The method of claim 2 wherein said combining said fuel control signals comprises combining said fuel control signals based on a second algorithm, said second algorithm being expressible as;

$$Wf_{REQ} = \sum_{k=1}^{3} (LA_k)(Wf_k)$$

where $WF_{REQ}$ corresponds to said fuel flow request signal and $Wf_k$ corresponds to said fuel flow control signal for the kth control loop.

4. The method of claim 2 wherein said input qualifiers are defined by said membership functions.

5. The method of claim 4 wherein said membership functions include normalized loop errors.

6. A fuel flow control system for use with an engine, including:

a processor receptive to engine parameter signals, said processor processing said engine parameter signals;

said processor generating a plurality of fuel flow control signals from a plurality of control loops;

said processor assigning a level of authority to each of said fuel flow control signals based on fuzzy logic;

said processor combining each of said fuel control signals based on said levels of authority to provide a fuel flow request signal;

wherein said fuzzy logic comprises a plurality of rules and membership functions;

wherein said rules comprise a lookup table having input and output qualifiers, said input qualifiers being defined by said membership functions; and wherein said membership functions include normalized loop errors.

7. A fuel flow control system for use with an engine, including:

a processor receptive to engine parameter signals, said processor processing said engine parameter signals;

said processor generating a plurality of fuel flow control signals from a plurality of control loops;

said processor assigning a level of authority to each of said fuel flow control signals based on fuzzy logic;

said processor combining each of said fuel control signals based on said levels of authority to provide a fuel flow request signal;

said processor computing said levels of authority based on a lookup table and a first algorithm, said lookup table having input and output qualifiers, said first algorithm being expressible as;

$$LA_k = \frac{\sum_{i=1}^{13} w_i X_{ik}}{\sum_{i=1}^{13} w_i} \quad k = 1, 2, 3$$

where k corresponds to a column in said lookup table which correlates with each of said control loops, $LA_k$ is said level of authority for the kth control loop, i corresponds to a row in said lookup table, $X_{ik}$ corresponds to a corresponding said output qualifier at the ith row and the kth column in said lookup table, and $w_i$ corresponds to a corresponding said input qualifier for the ith row.

8. The fuel flow control system of claim 7 wherein said combining said fuel control signals comprises combining said fuel control signals based on a second algorithm, said second algorithm being expressible as;

$$Wf_{REQ} = \sum_{k=1}^{3} (LA_k)(Wf_k)$$

where $Wf_{REQ}$ corresponds to said fuel flow request signal and $Wf_k$ corresponds to said fuel flow control signal for the kth control loop.

9. The fuel flow control system of claim 7 wherein said input qualifiers are defined by said membership functions.

10. The fuel flow control system of claim 9 wherein said membership functions include normalized loop errors.

* * * * *